3,446,555
OPTICAL RANGING AND DETECTION SYSTEM
FOR SUBMERGED OBJECTS
Elliott H. Kahn, Brooklyn, N.Y., assignor to Kollsman
Instrument Corporation, Elmhurst, N.Y., a corporation of New York
Filed Feb. 18, 1964, Ser. No. 345,674
Int. Cl. G01c 3/08; H01j 39/12; G06m 5/10
U.S. Cl. 356—5                                           8 Claims

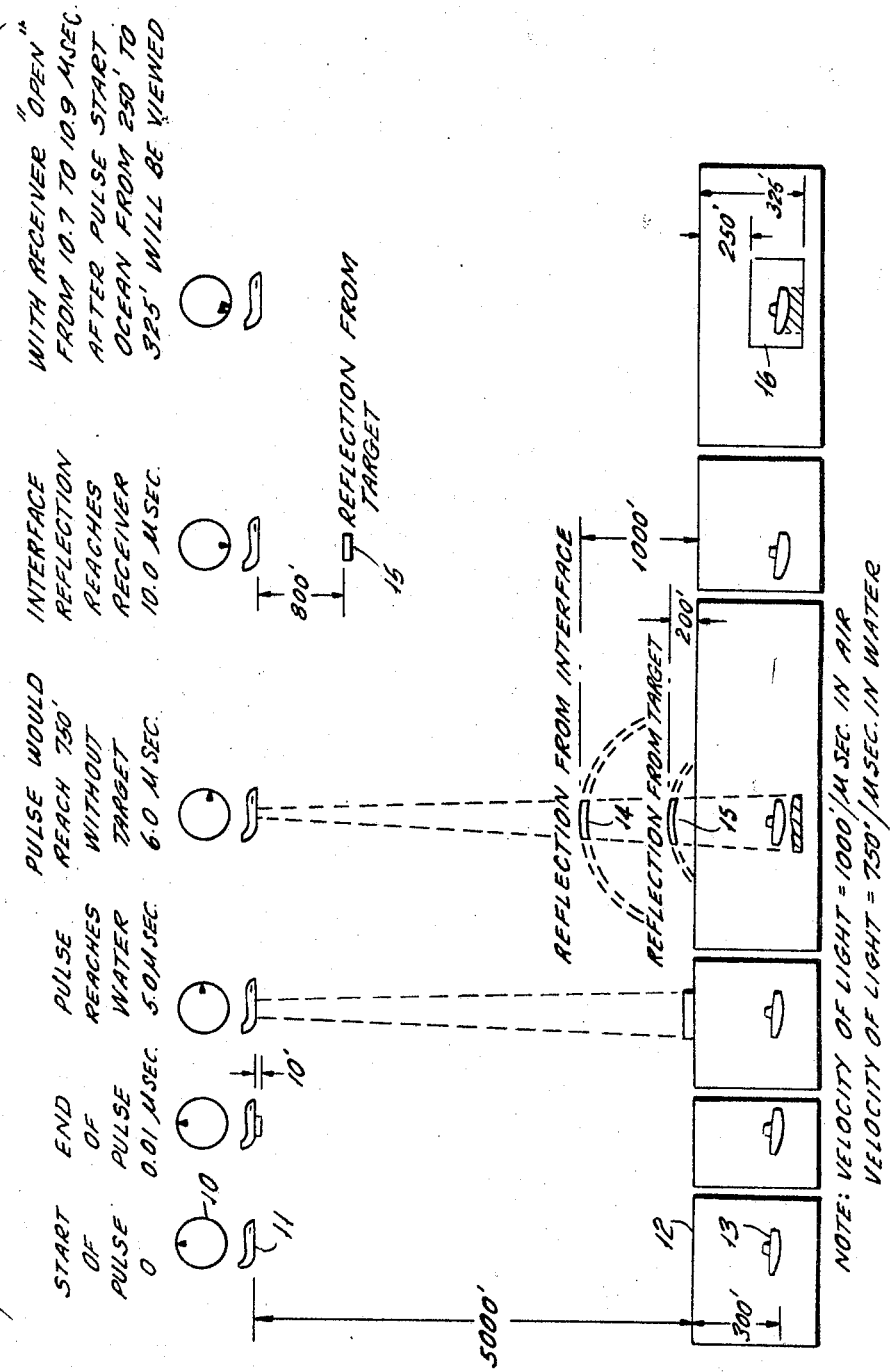

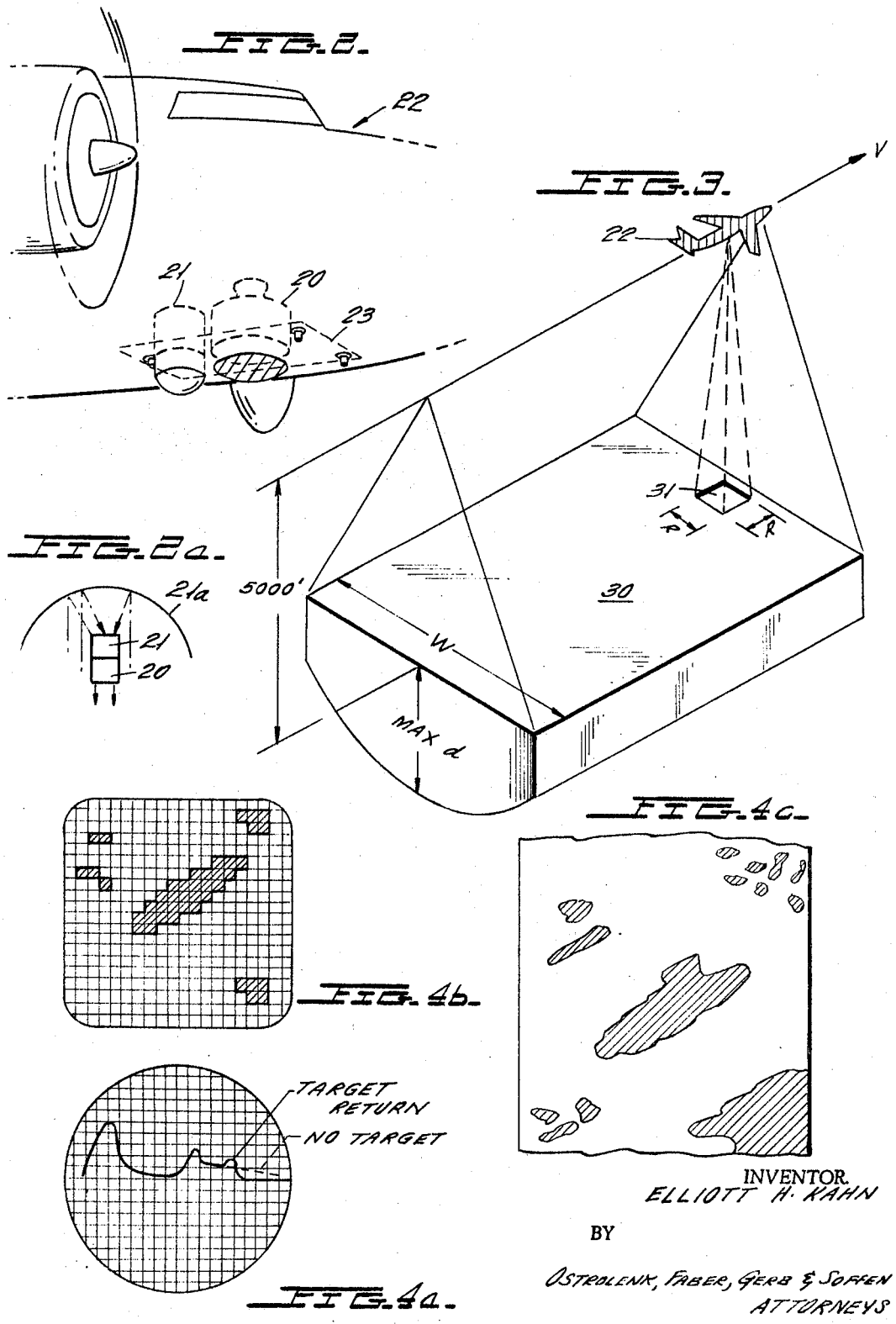

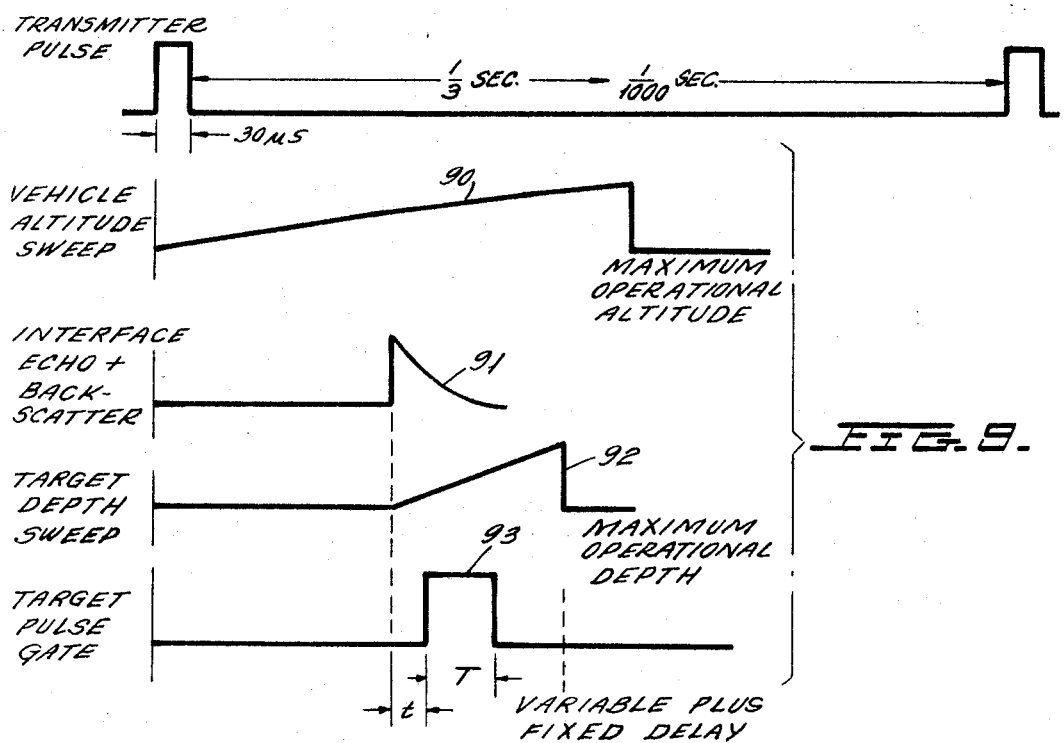
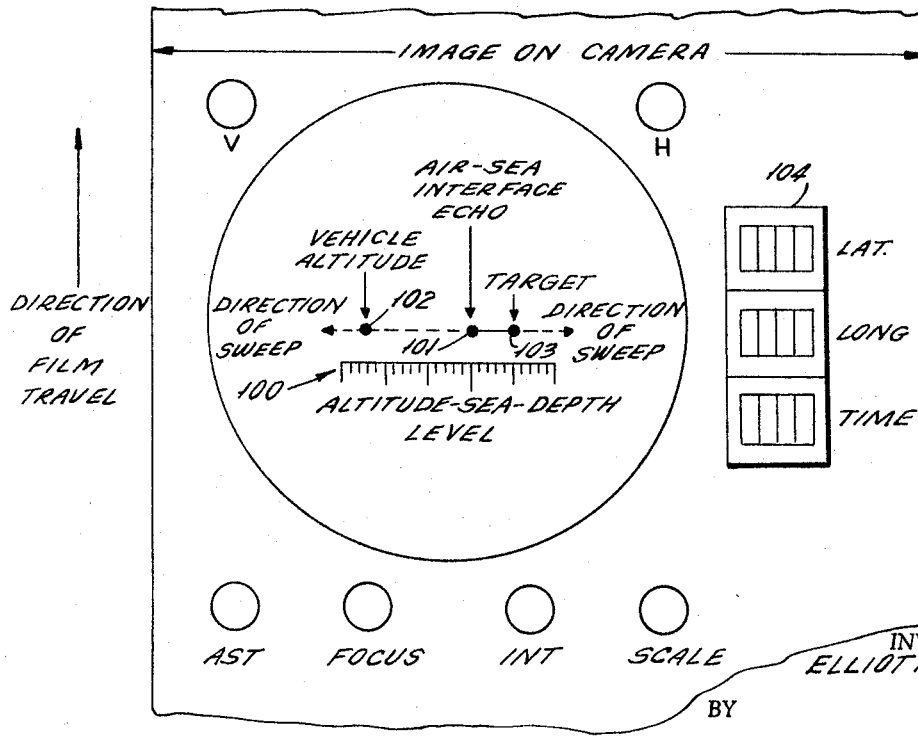

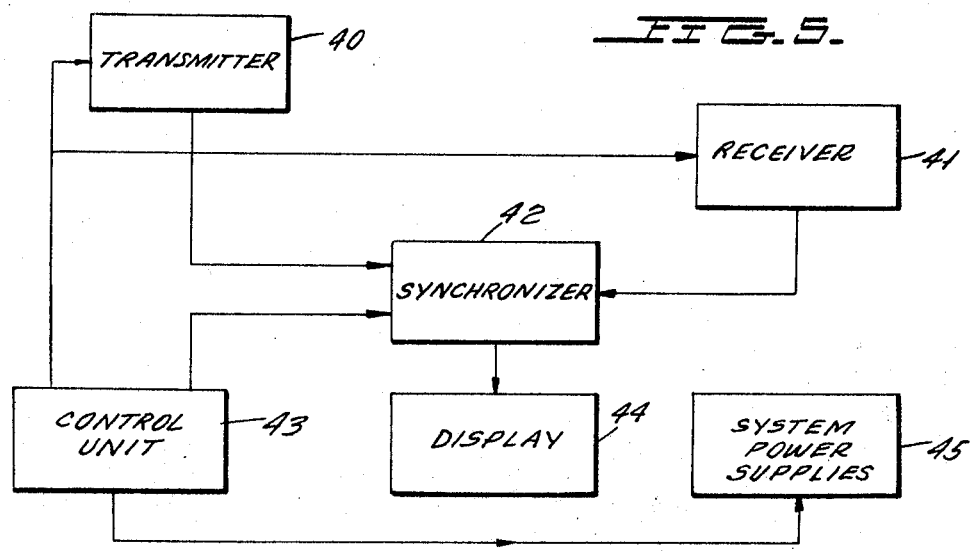
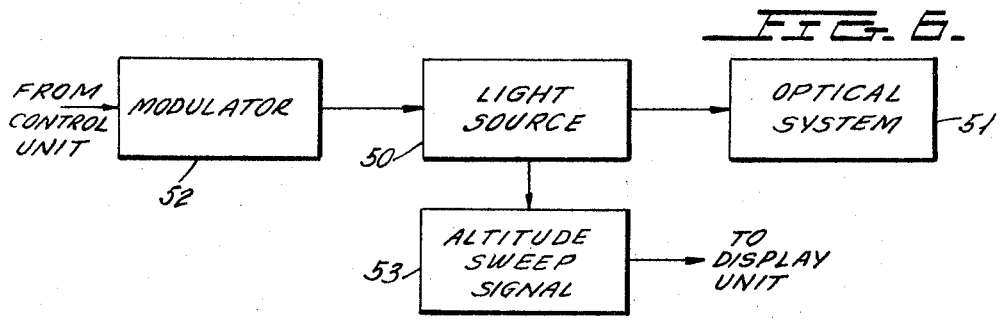
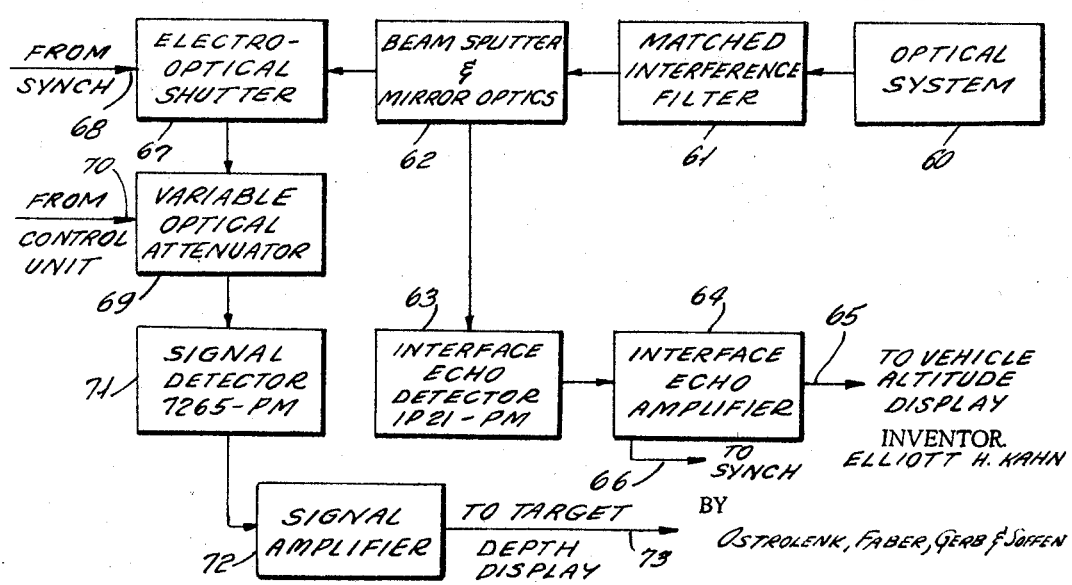

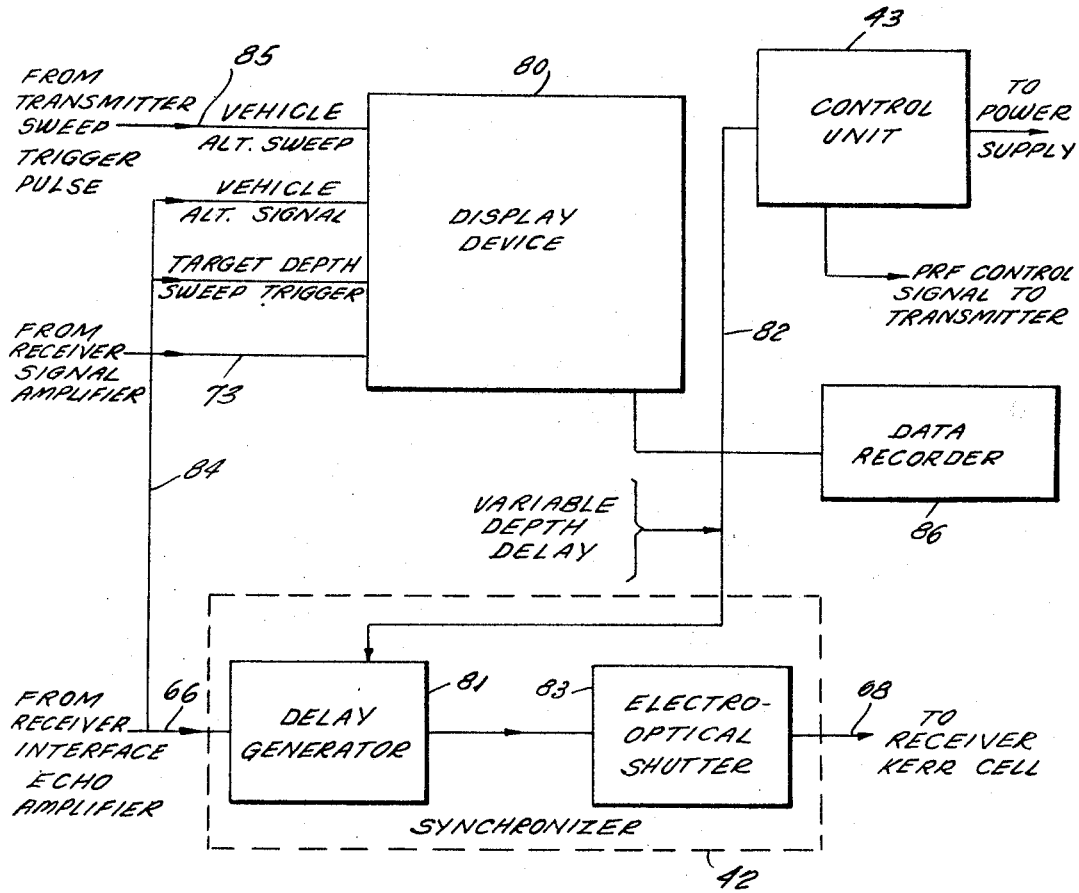
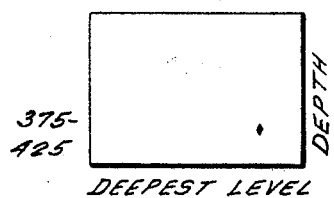
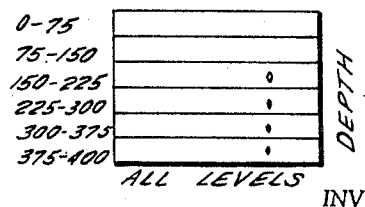

ABSTRACT OF THE DISCLOSURE

A submerged object indication system is carried from an aircraft flying above the water. A laser pulse generator directs a pulse at a small water area which may be 25 feet in diameter, and the receiver receives the air-water interface reflection which gates open a channel for receiving a submerged object reflection. A time delay is connected between an optical shutter and the detection circuit which receives the air-to-water interface reflection with the time delay related to the depth at which an object reflection is observed. The air-to-water interface signal can be used to drive an altimeter with signals displayed visually on a cathode-ray tube display. The light source is in the blue-green portion of the spectrum, with the light pulse lengths being about 0.01 microsecond.

---

This invention relates to a novel optical system, and more specifically relates to an optical system which is capable of detecting and ranging on submerged objects from overhead aircraft.

By way of an example, an aircraft flying at a height which could be, for example, from 1,000 to 5,000 feet, will be able to automatically determine the presence of a submerged object such as a submarine within some given area of the sea below the aircraft at depths to the order of 500 feet.

In general, and in accordance with the invention, a light transmitter is provided which may transmit a short pulse of either coherent or non-coherent light toward the surface of the body of water under surveillance. During this time, a light pulse receiver is closed to prevent backscattering of light into the receiver.

The receiver is rendered inoperative for some predetermined length of time which is equivalent to the length of time required for the pulse of light to pass from its source through the air-to-water interface to some predetermined depth range and back through the water and air to the receiver. The receiver is rendered operative at this time so that if there was an object in the predetermined depth range, a reflected pulse will be received by the receiver. The predetermined depth range can be varied so that the depth of the water may be studied for objects within the depth range of the equipment.

By way of example, if the aircraft is flying at a 5,000 foot altitude, it will take 5 microseconds for a 0.01 microsecond pulse of light to reach the ocean interface. In the next microsecond, the pulse of light will travel approximately 750 feet below the water surface, if not interrupted by a target. If the receiver is opened 10.7 microseconds after the interface reflection is detected and closed 0.2 microsecond later, this range gate will permit the viewing of ocean depths between 250 and 325 feet within the common field of view of the transmitter and receiver.

An important feature of the present invention is to utilize the reflection from the air-to-water interface as a timing means for controlling the receiver. Thus, in the above example, the interface reflection reaches the receiver 10 microseconds after the pulse is transmitted. This interface reflection may then be directly utilized to initiate opening of the receiver to underwater signals 0.7 microsecond after the interface reflection is detected. Thus, in accordance with the present invention, the use of the interface reflection provides a novel direct timing means for the operation of the receiver.

Another important feature of the invention is the use of pulses of duration less than the order of 30 nanoseconds. This will minimize the effect of backscattered light. The backscattered signal from longer pulses from the water would be brighter than the signal from the target so that the target would not be seen.

A further important feature of the invention is in the use of a gated detector. That is to say, since the dynamic range of the detector is necessarily limited, by gating the detector against relatively large reflections such as reflection from the air-water interface, the tube will now be more sensitive to the relatively small amount of reflection to the target.

As a still further important feature of the invention, it has been recognized that the cross-sectional area of the beam which strikes the water must have a specific optimal dimension which is of the order of 25 feet in diameter for a circular beam. The size of a large cross-sectional area beam must meet two conditions. The first is that it should be of the order of magnitude of the size of the target so that the greatest target reflection will be achieved. The second is that a large cross-sectional area beam will minimize the effect of capillaries (wavelets on the water which refract the beam) by averaging out the effect of such capillaries and waves on the refraction of the beam. For this reason it is desirable to have suitable means for adjusting the optical system so that as the altitude of the aircraft or, more generally, as the distance of the transmitter to the air-water interface changes, the diameter of the beam on the interface will be held to a constant optimum value.

It will be apparent that the range of depth being viewed can be swept in any appropriate manner, and it will be further apparent that some predetermined surface area beneath the aircraft can be scanned by the aircraft so that a single aircraft can cover a relatively large area of the ocean beneath the aircraft.

Another important feature of the invention is that it is almost impossible to camouflage a submerged vessel since, when searching beneath the level of the vessel, there will be a shadow and lack of return. Therefore, even if a vessel is camouflaged, it necessarily will have a shadow with respect to the search system.

The system of the invention is comprised of a plurality of basic sub-systems. The first sub-system is the transmitter structure. The transmitter structure utilizes a light source which is preferably in the blue-green portion of the spectrum which is less attenuated by ocean water. Any suitable source could be used such as a laser or a gas discharge lamp, or an arc, or any other suitable means. When the source is of the gas discharge type, it preferably has a large percentage of its output in the blue-green region with peak intensities of the order of $10^6$ lumens with the order of $1.6 \times 10^3$ watts at 5560 angstroms. The pulse is preferably shorter than 30 nanoseconds, and a 10 nanosecond pulse at ½ power points. A typical repetition rate of the pulses should be able to be of the order of 1,000 pulses per second.

Another desirable characteristic for the light source is that it has as little "tail-off" as possible. That is, it should decay to zero as soon as possible to permit better observation of the low-level return from submerged objects.

The transmitter sub-system will also include modulator means which can vary the pulse repetition frequency hereinafter denoted "prf" from 0 to 1,000 pulses per second.

The second major sub-system is the receiver. The receiver will include a synchronizing means which synchronizes the receiver operation with the transmitter operation. Preferably, the receiver will have a very low noise (equivalent input of the order of $10^{-14}$ watts for the detecting sensor), and can include a phototube which has its greatest sensitivity in the blue-green region, or in a region consistent with the transmitted pulse.

The next major sub-system will be the optical system for the transmitter and receiver. The transmitter optics can typically transmit a beam which will have a diameter of the order of 25 feet at a distance of 1,500 feet. Preferably, the 25 foot diameter should be maintained regardless of distance, as by the use of suitable servo systems in the focusing equipment. The receiver optics are preferably of the high gain type.

The last major sub-system includes the display structure wherein the display may be an appropriately calibrated oscilloscope "strip map, television presentation or any other suitable type display."

Other sub-groups would include a control unit which controls the operation of the transmitter and receiver, a synchronizer means which synchronizes the transmitter and receiver, as well as the system power supplies and mechanical structure for mounting the system to an aircraft.

Accordingly, the primary object of this invention is to provide a novel optical ranging system which can be carried above an air-to-water interface for detecting submerged objects.

Another object of this invention is to provide a novel optical ranging system which can be carried from an aircraft for optically surveying an underwater area.

Still another object of this invention is to provide a novel optical ranging structure for optically detecting submerged objects which utilizes the reflected light from the air-to-water interface as a means for synchronizing the operation of the transmitter and receiver.

Another object of this invention is to provide a novel optical ranging system which can detect the "shadow" of a camouflaged, submerged object.

Yet another object of this invention is to provide a novel optical ranging system which has a gated detector structure for improved sensitivity.

These and other objects of this invention will become apparent from the following description when taken in connection with the drawings, in which:

FIGURE 1 schematically illustrates the timed operation of a typical system of the present invention.

FIGURE 2 illustrates one manner in which the transmitter and receiver can be mounted in an aircraft.

FIGURE 3 illustrates an area of ocean which can be scanned by the system of the present invention.

FIGURE 4a illustrates the manner in which observed data can be represented on an A-type oscilloscope.

FIGURE 4b illustrates the manner in which the complete area scanned by the aircraft of FIGURE 3 can be presented in a TV-type presentation.

FIGURE 4c illustrates the manner in which the information obtained in the system of FIGURE 3 could be represented on a photographic strip map.

FIGURE 5 illustrates a block diagram of the major sub-systems of the present invention.

FIGURE 6 illustrates a block diagram of the transmitter sub-system.

FIGURE 7 illustrates a block diagram of the optical receiver sub-system.

FIGURE 8 illustrates a block diagram of the synchronizer, display and control units.

FIGURE 9 illustrates the timing wave forms used in the display system of FIGURE 8.

FIGURE 10 illustrates the particular distance-altitude-depth display of FIGURE 8.

FIGURE 11 illustrates a modified display scheme.

FIGURE 12 illustrates a modification of FIGURE 11.

It is to be first understood that the present invention can be implemented in several different ways. A first approach, for example, could utilize electromechanical scanning in combination with a multiplier phototube. Another aproach could utilize electronic scanning with an image-orthicon video camera tube. Other systems could be based on permutations of the components used in the above two basic systems.

In both systems, a sub-microsecond pulse (less than 0.1 microsecond) of light will be transmitted from an aircraft or other device. The pulse propagates through the atmosphere, the atmosphere-ocean interface, and through the water. The receiver is blocked during this interval, and cannot receive any backscattered light as the signal is radiated downward. In this regard, the system is analogous to the normal operation of a radar T–R tube antenna system.

At some preselected time, the receiver is opened for a specific interval, and the ocean depths are viewed for a target, illuminated by the pulse of light. The interval during which the receiver is opened depends upon the type of mission being flown, such as ranging or detection, etc.

The operation of the system is best illustrated in FIGURE 1 which illustrates the system at six instances of time. The timing of the system can be followed by the clock 10 which, reading from left to right, progressively increases. An aircraft 11 flies above the surface of water 12 at an altitude of 5,000 feet. A submarine 13 is located 300 feet below the water (note that the velocity of light in air is 1,000 feet per microsecond and decreases to 750 feet per microsecond when traveling in the water).

Initially, at time 0 on clock 10, a 0.01 microsecond pulse is initiated. Reading from left to right in the figure, the next time illustrated is the time at the end of the 0.01 microsecond pulse where the beginning of the pulse has travelled 10 feet.

The next time sequence illustrated is the point at which the 10-foot long light pulse reaches the surface of the water 12.

The fourth time sequence illustrates a reflected pulse 14 which is a light pulse reflected from the air-to-water interface, and a second pulse 15 which is a pulse which has been reflected from the target 13. This fourth sequence occurs at 6.0 microseconds after the start of the pulse. The reflected target pulse 15 has travelled a distance of 200 feet, while the reflected interface pulse has travelled 1,000 feet.

In the fifth time sequence shown in FIGURE 1, 10.0 microseconds have elapsed so that reflected pulse 14 has reached the receiver, while the pulse 15 which was reflected from the target is still 800 feet from the aircraft. In accordance with the invention, the reception of the interface pulse initiates the opening of a normally closed receiver carried in aircraft 11 with some predetermined time delay.

In the present instance, it may be assumed that the pulse 14 in time sequence 5 causes the receiver in aircraft 11 to open 0.7 microsecond after its reception, and remains open for 0.2 microsecond until reclosing. This will permit viewing by the receiver of the ocean depths between 250 feet to 325 feet, as indicated in time sequence 6. That is to say, if an object is in the volume 16, it will be seen by the receiver while the receiver is open during times 10.7 microseconds to 10.9 microseconds after the start of the pulse from the transmitter.

An important feature of the present invention makes the timing of the receiver dependent upon the reception of the interface reflection so that absolute timing without reference to other external effects is unnecessary.

It will be further noted that the length of time taken for the interface reflection to complete its travel from he aircraft to the water and back to the aircraft can be directly utilized as a measure of the altitude of the aircraft.

FIGURE 2 illustrates the manner in which a light transmitter 20 and optical receiver 21 can be mounted in an aircraft 22. The aircraft 22 can, for example, be a type P2V which, in a typical mission, could cruise at approximately 400 feet per second at a specified altitude of 1,500 feet. The light transmitter 20 and optical receiver 21 can be mounted on a common platform 23 which is appropriately secured to the bottom of the aircraft, as desired. It is to be noted that the structure shown in FIGURE 2 may additionally include suitable means for causing the scanning action of the light beam (not shown) and could additionally include a stable platform for mounting the equipment so that the equipment will be held in a predetermined position regardless of the motion of the aircraft.

Another manner in which the transmitter and receiver equipment could be arranged on the aircraft is shown in FIGURE 2a wherein the transmitter 20 and receiver 21 are mounted in a common package which is located within a reflecting parabolic surface 21a. Thus the receiver 21 and transmitter 20 are coaxially arranged with the receiver section 21 facing the reflector 21a. This type arrangement is particularly suitable where the light source of the transmitter 20 is of the coherent type.

Where systems using either photomultiplier tubes or image-orthicons are to be used at night, a typical system would have the performance figures shown in the following Table I. It will, of course, be recognized that all of the parameters given herein can be changed when other parameters of the system are similarly changed. Table I indicates the various powers required at various locations through a given system for a prf of 10,000 and a pulse duration of 0.01 microsecond.

TABLE I

| Location | Photo multiplier system | Image orthicon system |
| --- | --- | --- |
| Source (non-coherent) (watts) | $10^9$ | $10^6$ |
| Beam (watts) | $5 \times 10^4$ | $2 \times 10^5$ |
| Efficiency (optics and interface) (watts) | $5 \times 10^3$ | $2 \times 10^4$ |
| At target 600'/300' (watts) | $5 \times 10^{-1}$ | $2 \times 10^2$ |
| Reflected from target (watts) | $5 \times 10^{-2}$ | $2 \times 10$ |
| At surface (watts) | $5 \times 10^{-6}$ | $2 \times 10^{-1}$ |
| Detector (watts) | $2 \times 10^{-14}$ | $5 \times 10^{-11}$ |
| Resolution (ft.) | $50 \times 50$ | $25 \times 25$ |

If a device having the performance figures of Table I were now applied to an aircraft with appropriate lateral scanning equipment, such as aircraft 22 of FIGURE 3, the aircraft will be able to scan a volume of water having the cross-sectional configuration shown by body of water 30. In particular, and with an aircraft altitude of 5,000 feet, the transmitter may illuminate differential surface element 31 having dimensions of $R \times R$ wherein R could typically be of the order of 50 feet when the system utilizes photomultiplier tubes, or 25 feet when the system uses image-orthicons. A suitable servo-system may be provided for the transmitting optics to insure a constant diameter beam at the air-to-water interface regardless of altitude.

The dimension W which is the extent of the lateral scanning range may typically be of the order of 5,800 feet when using photomultipliers, and 2,500 feet when using image-orthicons. The maximum depth which can be surveyed is given in the following Table II for the case of the photomultiplier-type system where the maximum depth D is seen to increase with a decrease in the forward velocity of the aircraft.

The information contained in Tables II and III is, of course, directly related to a system of the type having the parameters shown in Table I. The limitations of the system are clearly a function of the system design so that the figures could be improved by suitable modification of the system parameters.

TABLE II

| V (ft./sec.) | D (ft.) |
| --- | --- |
| 1500 | 360 |
| 150 | 440 |
| 15 | 510 |
| 1.5 | 590 |

TABLE III

| V (ft./sec.) | D (ft.) |
| --- | --- |
| 1500 | 110 |
| 150 | 280 |
| 15 | 260 |
| 1.5 | 330 |

The manner of presentation of the data obtained in the operation of the system of FIGURE 3 can be of many different types. By way of example, the data can be presented directly on an A-scope, as illustrated in FIGURE 4a, which includes information to the point of transmission of the pulse, the return of the interface reflection, and finally, the return of a target signal.

More specifically, the first pulse is the transmitted pulse from the vehicle. The second pulse is the return of the pulse reflected from the air-sea interface. The last pulse is the reflected target return. It will be observed that the intensity drops off sharply after reflected target return due to the absence of backscatter beyond the target. It will also be observed that there is some intensity between first and second pulses and the second and third pulses which is due to atmospheric backscatter, and backscatter from the sea respectively. Note that a camouflaged target would be observed by the failure of a continuous "no target" line (shown in dotted lines), since the shadow of the camouflaged target will cause a drop in the target return to zero, without the target return pulse.

Alternatively, a TV-type presentation can be provided, as illustrated in FIGURE 4b, wherein each discrete square of the grid shown represents a discrete elemental scanned area. Any of the areas which are dark indicates the presence of a return signal in that area whereby a complete underwater strata can be directly charted. Clearly, the screen selected must be able to retain a signal for the length of time required for the aircraft to travel the distance equivalent to the longitudinal number of scanned areas.

A still further manner of presentation of the information obtained in the system of FIGURE 3 is shown in FIGURE 4c which is a photographic strip map of the well-known type. It will be noted that the strip map has responded to the same pattern as the TV-type presentation system of FIGURE 4b.

A block diagram of the complete system of the present invention is shown in FIGURE 5, and includes the transmitter 40, receiver 41, synchronizer 42, control unit 43, display 44, and the system power supplies 45.

The control unit, which is appropriately programmed, drives the transmitter 40, receiver 41 and controls the operation of synchronizer 42. The synchronizer 42 essentially operates to "open" the receiver a predetermined time after the reflected pulse from the air-water interface has been received and to hold the receiver "open" for a predetermined length of time which corresponds to the range of depth being studied at any instant. Thus, the synchronizer 42 passes only this information from receiver 41 to the display along with other desired information such as the signal caused by the reception of the air-to-water interface reflection, and the initial transmission of the pulse from transmitter 40.

FIGURE 6 shows a block diagram of the sub-system of transmitter 40 of FIGURE 5. Thus, the transmitter sub-system will include a light source 50, reflective optics 51 which transmits a beam having the required divergence from the aircraft carrying the transmitter, and a modulator 52 which is a variable prf modulator controlled by signals from the control unit 43 of FIGURE 5 in the desired or programmed manner. The light source 50 is also connected to an altitude sweep signal unit 53 which permits information to the operation of light source 50 to be transmitted to the display unit 44 of FIGURE 5, as will be more fully described.

A typical light source that could be used for light source 50 can be any suitable laser or spark gap-type device or gas discharge tube. For purposes of illustration, a suitable device may be formed by a spark-gap light source which provides an output of approximately 25 nanoseconds, and an arc size of the order of 1 millimeter by 1 millimeter. With this system, a f/0.25 reflective lens could be used in the reflective optics 51.

Other types of light sources could be utilized which are of the gas discharge type having a large percentage of their output in the blue-green region of the spectrum. In any of these types of gas discharge lamps, a trade-off is made between pulse time and output where the order of 50% output in the blue-green region is required. Clearly, lasers would have great utility as the source of light for the novel system of the invention.

Where a laser source is used, its output is preferably in the region of transparency of the sea water and will be extremely narrow. With this application, an extremely narrow band filter of the order of 10 A. or less wide is preferably used with the laser so that incoherent ambient light reflected from the water will be insignificant compared to the amount of the reflected coherent light from the target in this same narrow frequency band.

Referring next to FIGURE 7, I have shown therein a block diagram of the optical receiver sub-system. The receiver system includes a suitable optical portion 60 which could, for example, be an appropriately modified telescope normally used in a star tracker-type device. The optics 60 transmits the observed reflected light through a matched interference filter 61 which is matched to the selectivity of sea water to thereby eliminate undesired radiation from reflected sunlight, starlight and the flash lamp in the transmitter.

The light thereafter passes to a beam splitter and appropriate mirror optics 62 where a first portion of the beam is directed to an interface surface echo detector 63 which may be an appropriate detector such as a type 1P21 multiplier tube. The interface echo detector 63 then transmits an output signal to amplifier 64 so that the interface signal is taken to a vehicle altitude display over line 65, if such a display is desired, while another signal is taken over line 66 to the synchronizer of FIGURE 5.

The second beam from beam splitter 62 is transmitted to an appropriate receiver blocking structure 67 which, in turn, is controlled by the output line 68 coming from the synchronizer.

The blocking structure 67 could take many different forms. Thus any suitable electromechanical or electro-optical shutter could be used. One typical device which can be used is a Kerr cell where unit 67 would include the Kerr cell, polarizer and analyzer. Thus, the synchronizer 42 of FIGURE 5 will provide an output signal to line 68 of FIGURE 7 which will render the Kerr cell transparent or opaque to the light impinging thereon.

The output of Kerr cell 67 is then transmitted to a variable optical attenuator system 69 which is under control of signals from control unit 43 of FIGURE 5 over the line 70 of FIGURE 7, and thence to an appropriate photomultiplier type signal detector 71 which can, for example, be of the type 7265. The output of signal detector 71 is then amplified in amplifier 72 with the amplifier output being connected to a target depth display over line 73.

It is to be particularly noted that the synchronizer 42 will cause the Kerr cell to operate in response to signals generated by the interface echo detector 63 and connected to the input of the synchronizer over line 66. Thus, the Kerr cell, polarizer and analyzer serve as a "shutter" for the receiver.

FIGURE 8 illustrates a block diagram of the display equipment and associated electronics including a conventional dual beam oscilloscope 80 for providing a type A presentation. FIGURE 8 also illustrates some of the details of the synchronizer 42, shown in dotted lines in FIGURE 8, as including a delay generator 81, the operation of which is initiated by the signal on line 66 from the interface echo amplifier 64 of FIGURE 7.

As is further shown in FIGURE 8, the control unit 43 is connected to the delay generator 81 over the line 82 wherein the programmed control unit will cause some predetermined delay in the operation of the delay generator so that the Kerr cell modulator 83 which is connected to Kerr cell 67 over line 68 is initiated only a predetermined time after the reception of the interface reflection signal.

The dual beam oscilloscope 80, or any equivalent display device, is then provided with a first set of inputs which include a signal from line 73 of FIGURE 7, which is the signal system along with a target depth sweep signal connected to line 84. The second set of inputs for oscilloscope 80 is the vehicle altitude signal which is also taken from line 84, and a vehicle altitude sweep signal applied to line 85, which is obtained from the transmitter sweep trigger pulse. If desired, and as illustrated in FIGURE 8, the display oscilloscope 80 can be connected to a further data recorder 86 which will make permanent records of the data observed.

FIGURE 9 illustrates the typical timing wave forms utilized in the system of FIGURE 8. It will be noted that all of the curves shown in FIGURE 9 are plotted to a common time axis.

Thus, the transmitter pulse which is shown to be 10 nanoseconds wide is used to initiate the vehicle altitude sweep 90. Several microesconds later (depending on altitude), the interface echo 91, clearly identifiable because of its magnitude, is fed by the interface detector 63 ultimately into the display unit over line 65. This initiates the target depth sweep 92 and provides an accurate indication of vehicle altitude. This same signal also initiates the delayed receiver unblocking gate. This is accomplished by triggering the delay generator 81 of FIGURE 8 in the synchronizer which ultimately causes the Kerr cell shutter to be turned off for a gate interval. During this time, in the event that a target is within the range of the equipment, the target pulse gate 93 will be received by the equipment.

The actual appearance of the distance-altitude-depth display of the dual beam scope 80 could be of the type shown in FIGURE 11. Thus, the instrument face is provided with a scale 100 which is read to the right of the sea level indication for depth, and to the left of the sea level indication for altitude. The unit is preferably an intensity modulated cathode-ray tube where separate left-right sweeps are provided with reference to the interface echo 101. The altitude of the vehicle will then be indicated by the dot 102, while the target dept will be shown by illuminated area 103.

Data storage may then be accomplished by imaging the trace shown on the tube screen along with time and position signals which can be continuously presented in indicator 104 on a linearly indexed film. Note that since this particular type of display is a non-imaging system, there is no dependence of recording on vehicle velocity, and it is only necessary that the indexing rate be precisely related to the system integration time.

It has been assumed in the previous display embodiments that the image on the display photocathode of a particular area of sea does not move during the storage-scanning process. This is necessary in order to preserve resolution. Thus, the camera tube or the optics must be moved in unison with the aircraft speed in much the same way as film is moved in aerial photography.

The information measured may be displayed on a kinescope with long persistance phosphor or on a modified memoscope. The presentation can be either of two forms, as shown in the FIGURES 11 and 12.

In FIGURE 11 only the deepest level reached before return is displayed as a dot on the screen. A submerged object will cast a shadow which will be detected. In FIGURE 12 all levels are presented in individual strips and a submerged object will be seen at its level and will cast a shadow in lower levels. Each of these presentations lasts, for example, 4 seconds. Note in FIGURE 12 that a target is located in the 150–225 foot range while its shadow is found in the lower ranges.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

The embodiments of the invention in which an exclusive privilege or property is claimed are defined as follows:

1. A submerged object indication system comprising a pulsating light source, and a light receiver for receiving reflections of the light of said pulsating light source from an air-to-water interface and from an object on the water side of said interface; said light receiver comprising an optical system for receiving said reflections, first light detector means aligned with said optical system for detecting light reflected from said object, second light detector means aligned with said optical system for detecting light reflected from said interface, a light signal controlling means positioned between said optical system and said first light detector means and operable between a light signal transmitting condition and a light signal blocking condition to respectively permit and prevent energization of said first light detector means by light gathered by said optical system, means connecting said second light detector means to said light signal controlling means for operating said light signal controlling means to its said transmitting condition for a predetermined length of time responsive to detection of an interface reflection by said second light detector means, and delay means connected between said second light detector means and said light signal controlling means to delay the occurrence of the said transmitting condition of said light signal controlling means for a predetermined length of time after reception of an interface reflection of said second light detector means.

2. The system substantially as set forth in claim 1 wherein said light source is a laser; and optical filter means for said light receiver; said filter means for said light receiver being operable for passing substantially only the band of light frequencies generated by said light source.

3. The system substantially as set forth in claim 1 which further includes optical filter means for said light receiver; said filter means for said light receiver being operable for passing substantially only the band of light frequencies generated by said light source.

4. The system substantially as set forth in claim 1 wherein the pulses of said pulsating light source have a duration of less than 30 nanoseconds.

5. The system substantially as set forth in claim 1 wherein the pulses of said pulsating light source have a sharp cut-off shape.

6. The system of claim 1 wherein said pulsating light source transmits light pulses in the blue-green portion of the spectrum.

7. The system of claim 1 wherein said light pulses have a duration of the order of 0.01 microsecond.

8. The system of claim 6 which includes optical focusing means for said pulsating light source for illuminating an approximately 25 foot diameter area of said air-to-water interface.

References Cited

UNITED STATES PATENTS 3,119,091   1/1964   Hopkin et al. _____ 340—1
3,278,753   10/1966  Pitts et al. _____ 88—1

RONALD L. WIBERT, *Primary Examiner.*

F. L. EVANS, *Assistant Examiner.*

U.S. Cl. X.R.

250—209, 222